United States Patent
Pringle

[15] 3,655,273
[45] Apr. 11, 1972

[54] REMOTELY CONTROLLED DAY-NIGHT MIRROR

[72] Inventor: William L. Pringle, Grosse Pointe, Mich.

[73] Assignee: Lee Radke Associates, Inc., Detroit, Mich.

[22] Filed: July 23, 1970

[21] Appl. No.: 57,628

[52] U.S. Cl.............................................350/281, 74/501 M
[51] Int. Cl. ......................................B60r 1/06, G02b 7/18
[58] Field of Search.........................................350/279–281; 74/501 M

[56] References Cited

UNITED STATES PATENTS 3,550,456   12/1970   Pringle............................350/281 UX
3,253,509   5/1966    Peters...................................350/281

*Primary Examiner*—John K. Corbin
*Attorney*—McGlynn, Reising, Milton & Ethington and Adelman, Krass, Perry, Young & Thorpe

[57] ABSTRACT

An improved remotely controlled day-night mirror assembly including a movably supported mirror having two reflecting surfaces of different reflecting power. The actuator means includes a generally cup-shaped housing with a primary actuating member supported for universal movement within the housing and a secondary actuating member supported in a semi-spherical cavity in the primary actuating member and on the head of a shaft for movement relative to the primary actuating member between day and night positions and for movement with the primary actuating member about a common point of universal movement when either in the day or night position for selectively positioning the mirror. The secondary actuating member is connected to the mirror by three push-pull remote control elements. One improved feature resides in connection means comprising tongues and grooves interconnecting the primary and secondary actuating members for only allowing movement of the secondary actuating member relative to the primary actuating member in a plane passing through their common point of universal movement. Another improved feature resides in a control cam means operatively interconnecting the primary and secondary actuating members for moving the secondary actuating member between day and night positions relative to the primary actuating member. More specifically, the cam means includes a pair of diametrically opposed protrusions on the secondary actuating member and a cross member secured to the end of a shaft for rotation relative to the primary actuating member so that the cross member engages the protrusions to move the secondary actuating member relative to the primary actuating member.

15 Claims, 5 Drawing Figures

Patented April 11, 1972 3,655,273

INVENTOR.
William L. Pringle
BY
Barnard, McGlynn & Reising
ATTORNEYS

REMOTELY CONTROLLED DAY-NIGHT MIRROR

This invention relates to a remotely controlled day-night mirror assembly of the type including a mirror movably supported on the exterior of a vehicle with motion transmitting means extending between the mirror and actuator means disposed in an accessible position within the vehicle. Mirrors of this type are prismoidal having two reflecting surfaces of different reflecting power and in planes which converge toward a common line of intersection to provide a highly intense image during day driving and to provide a dimmed image of reduced intensity for night driving when moved to a different angular position.

In the chronological development of such mirrors, the first assemblies control the mirror by an actuator universally supported in a housing and connected to the mirror through motion transmitting remote control assemblies for selectively positioning the mirror to a proper position for viewing to the rear by an operator. In these assemblies, the adjustment of the mirror between day and night positions after it had been moved to the desired viewing position is accomplished by an additional actuating lever movably supported by the housing adjacent the actuating member and operatively connected to the mirror assembly through an additional motion transmitting element.

An important improvement to such an assembly was made with the development of an actuator which includes a primary actuating member universally supported in a housing with a secondary actuating member universally supported within the housing and disposed in a spherical cavity in the primary actuating member. The secondary actuating member is connected to the mirror through three motion transmitting elements. Means operatively interconnects the secondary and primary actuating members for moving the secondary actuating member independently of the primary actuating member to move the mirror between the day and night positions. Such an assembly is disclosed in copending U.S. application, Ser. No. 2,252 filed Jan. 12, 1970 in the name of David P. Jones and assigned to the assignee of the instant invention. The means in that assembly interconnecting the secondary actuating member and the primary actuating member for moving the secondary actuating member comprises a strip of metal which extends through an elongated slot in the primary actuating member and has a knob on the end thereof. The secondary actuating member is moved by moving the knob from one end of the slot to the other.

Although the inventive concept set forth in the above copending application is superb and solves many of the problems associated with the prior art; it, like anything else, can be improved and has been improved by the instant invention. This area of improvement comes about because of the fact that in manipulating the strip of metal for moving the secondary actuating member independently of the primary actuating member in the prior art assembly, forces and moments are established which move the primary actuating member and consequently move the mirror out of position.

It has also been discovered that the movement of the secondary actuating member relative to the primary actuating member should be limited in order to assure movement of the reflecting surfaces of the mirror about an axis which is maintained in a constant spacial relationship with the primary actuating member. Otherwise the selected position of the mirror could change by universal movement of the secondary actuating member independently of the primary actuating member.

Accordingly, it is an object and feature of this invention to provide such a mirror assembly including control means interconnecting the secondary and primary actuating means whereby upon actuation of the control means there are no forces transmitted to the primary actuating member which would tend to universally move the primary actuating member.

In correlation with the foregoing object and feature, it is another object and feature of this invention to provide such a remotely controlled day-night mirror wherein the control means is rotatably supported by the primary actuating means for rotation independently of the primary and secondary actuating means and coacts with the secondary actuating means for moving the secondary actuating means between the day and night positions.

In correlation with the foregoing objects and features, it is another object and feature of this invention to provide such a remotely controlled day-night mirror assembly wherein the control means is rotatably supported by the primary actuating means for rotation relative thereto about an axis which passes through a point about which the primary and secondary actuating means move universally so as to prevent the application of forces to the primary actuating means while moving the secondary actuating means between the day and night positions.

It is another object and feature of this invention to provide such a mirror assembly including connection means interconnecting the primary and secondary actuating members for only allowing movement of said secondary actuating member relative to said primary actuating member in a plane passing through this common point of universal movement.

Other objects and attendant advantages of the present invention will be readily appreciated as the same becomes better understood by reference to the following detailed description when considered in connection with the accompanying drawings wherein.

Referring now to the drawings wherein like numerals indicate like or corresponding parts throughout the several views, a preferred embodiment of a remotely controlled day-night mirror assembly constructed in accordance with the instant invention is generally shown at 10 in FIG. 1.

Figure 1:
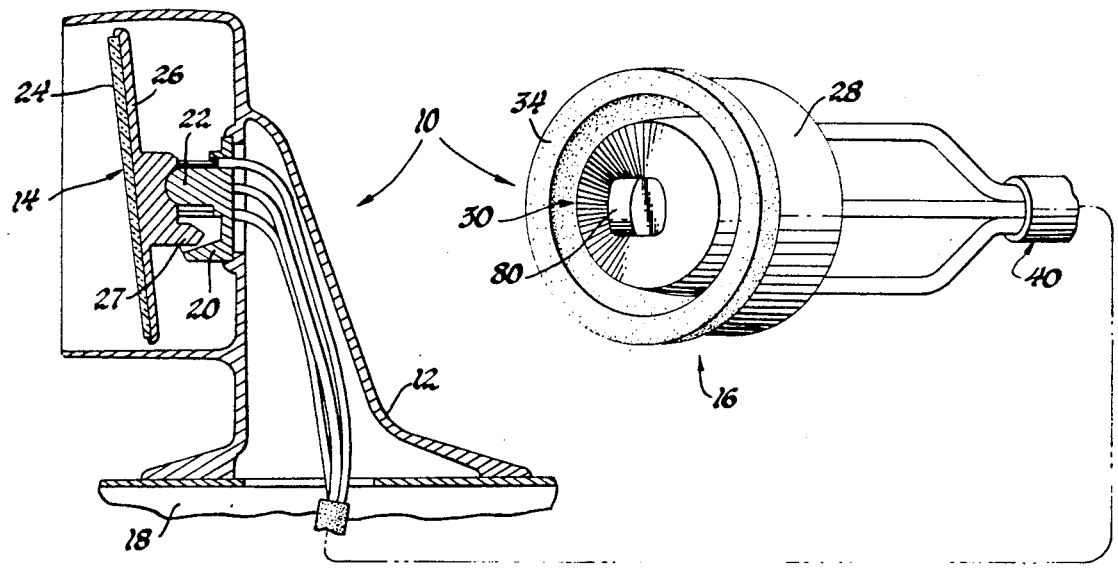
FIG. 1 is a view of a preferred embodiment of the instant invention showing the mirror and its associated base and cross section and showing the improved actuator means in perspective.

The assembly 10 includes a base 12, a mirror means generally indicated at 14 and movably supported by the base 12, and actuator means generally shown at 16.

The base 12 is attached to the wall 18 of a vehicle, such as the exterior wall of a fender or door. The base 12 is attached to the wall 18 by adhesive, bolts or other fastening means. The base 12 includes a member 20 which is secured thereto or made to form an integral part thereof and which defines a projection 22 having a semi-spherical end surface.

The mirror means 14 includes a mirror 24 of the prismoidal type having two reflecting surfaces of different reflecting power and supported in a member 26. The member 26 has a female semi-spherical surface coacting with the projection 22 so that the mirror 24 is supported on the base for universal movement relative thereto. The support member 26 includes a projection 27 which extends into a cavity in the member 20 for preventing rotation of the mirror means 14.

The actuator means 16 is operatively connected to the mirror means 14 for adjusting the position of the mirror means 14 relative to the base 12.

The actuator means includes a support means or housing 28. The housing 28 is circular and generally cup-shaped and has an opening extending thereto. The housing 28 is attached by appropriate means to the interior of a vehicle. Preferably the housing 28 is recessed into a wall by being disposed through an opening in the wall of a vehicle.

The actuator means 16 includes a primary actuating means or member which is generally indicated at 30. The primary actuating member 30 is movably supported by the housing 28 through a positioning means comprising the ring 32. The major portion of the ring 32 is disposed in a groove within the housing 28 and has a flap 34 extending therefrom and about the open end of the housing 28. The ring 32 is preferably made of a plastic and frictionally engages and outer semi-spherical surface 36 on the primary actuating member 30.

Also included is a secondary actuating means or member 38 supported for universal movement relative to the primary actuating member 30 between the day and night positions. The secondary actuating member 38, through frictional engagement, also moves with the primary actuating member 30 when in either of the day or night positions.

A motion transmitting means generally indicated at 40 operatively interconnects the mirror means 14 and the secondary actuating member 38 whereby the mirror means 14 may be moved to a selected position by moving the primary actuating member 30 which in turn moves the secondary actuating member 38 and whereby the secondary actuating member 38 may be moved independently of the primary actuating member 30 between the day and night positions to selectively present only of the two reflecting surfaces of the mirror 24. More specifically, the motion transmitting means 40 includes three push-pull assemblies, each including a motion transmitting element 42 connected at one end to the member 26 of the mirror means and connected at the other end to the secondary actuating member 38. The motion transmitting elements 42 are connected to the secondary actuating member 38 by slugs 44 secured to the ends thereof and disposed in bores in the secondary actuating member 38. The cables or elements 42 are equally spaced about the point of universal movement of the secondary actuating member 38.

The support means also includes a support shaft 46 slidably supported in the component 48, the component 48 forming a part of the housing 28. The support shaft 46 includes a spherical head 50.

The secondary actuating member 38 includes a first female semi-spherical surface 52 in sliding engagement with the head 50 of the support shaft 46. In other words, the secondary actuating member 38 is universally supported for universal movement about a point which defines the center of the spherical head 50.

The primary actuating member 30 includes a cavity therein which presents a second female semi-spherical surface 54. The secondary actuating member 38 includes a second male semi-spherical surface 56 in sliding engagement with the second female semi-spherical surface 54. Thus, both the primary actuating member 30 and the secondary actuating member 38 are universally supported for universal movement about a point which forms or is disposed at the center of the spherical head 50. The ring 32 frictionally engages the male semi-spherical outer surface 36 of the primary actuating member 30 for retaining the primary actuating member 30 in any selected position to which it is universally moved.

The member 48 is secured by an appropriate means such as bolts (not shown), a snap ring or the like to the remainder of the housing 28. A biasing means comprising a spring 58 reacts between the support shaft 46 and the member 48 of the housing for urging the head 50 into engagement with the secondary actuating member 38 which in turn urges the secondary actuating member 38 into engagement with the primary actuating member 30 which in turn urges the primary actuating member 30 into engagement with the ring 32. A snap ring or washer 60 is disposed about one end of the support shaft 46 for retaining the support shaft 46 in the housing.

The assembly also includes connection means comprising the tongues 62 and grooves 64 interconnecting the primary and secondary actuating members 30 and 38 for limiting relative rotation therebetween. The tongues 62 extend from the second male semi-spherical surfaces 56 and the grooves extend into the second female semi-spherical surfaces 54.

The tongues and grooves 62 and 64 interconnect the primary and secondary actuating members for preventing relative rotation therebetween as by only allowing movement of said secondary actuating member 38 relative to said primary actuating member 30 in a plane passing through the common point of universal movement thereof, i.e., the center of head 50. This plane of movement passes through and is coexistive with the tongues 62 and grooves 64. This connection means is the first novel feature of this invention.

The second novel feature in the assembly resides in the control means generally shown at 70. The control means 70 operatively interconnects the primary and secondary actuating members 30 and 38 for moving the secondary actuating member 38 relative to the primary actuating member 30 between the day and night positions while preventing the application of forces to the primary actuating member 30 which would move the primary actuating member 30. In other words the control means 70 moves the secondary actuating member relative to the primary actuating member in the plane of movement defined by the tongues 62 and grooves 64. The control means 70 is rotatably supported by the primary actuating member 70 for rotation independently of the primary and secondary actuating members 30 and 38 about an axis which passes through the center point of the head 50 and coacts with the secondary actuating member 38 for moving the secondary actuating member 38 between the day and night positions. In other words, the control means 70 rotates about an axis which passes through the point about which the primary and secondary actuating members 30 and 38 universally move.

The control means 70 includes cam means for moving the secondary actuating member 38 between the day and night positions. The cam means includes a pair of protrusions 72 extending from the secondary actuating member 38 on diametrically opposite sides of the axis of rotation of the control means 70. The cam means also includes a member generally indicated at 73 having a first radial portion defining an arm 74 and a second oppositely extending radial portion defining an offset arm 76. The arms 74 and 76 are movable into and out of engagement with the protrusions 72 for moving the secondary actuating member 38 between the day and night positions.

The control means further includes a shaft 78 rotatably supported by the primary actuating member 30 for rotation about the axis which passes through the center of the head 50. The member 73 is supported by and is attached to a first end of the shaft 78 and extends diametrically thereacross. A knob 80 is secured to the second end of the shaft 78. The knob 80 may be manually grasped for rotating the shaft 78.

The offset arm 76 has an end portion which is offset from the direction parallel to the axis of rotation of the shaft 78 for engaging one of the protrusions 72 when the arm 74 engages the other protrusion 72.

There is also included friction means for frictionally retaining the control means 70 in the position with the member 73 engaging the protrusion 72. More specifically, the friction means is defined by a bifurcated end 82 of the arm 74 for straddling one of the protrusions 72 for frictionally retaining the member 73 in engagement with the protrusion 72.

Figure 2:
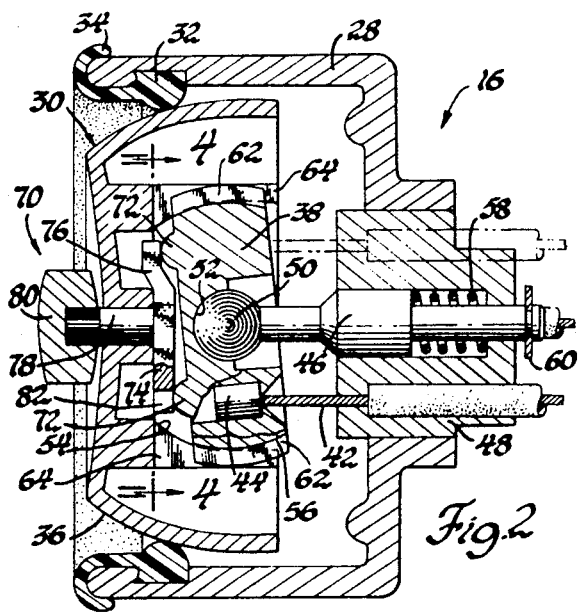
FIG. 2 is an enlarged fragmentary cross sectional view of a preferred embodiment of the actuator means of the instant invention and in the position where the mirror is in the night position.
Figure 3:
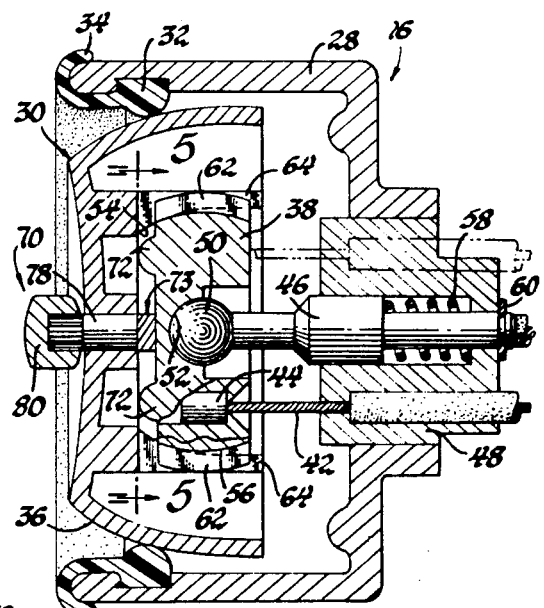
FIG. 3 is an enlarged fragmentary cross sectional view similar to FIG. 2 but showing the components in the position where the mirror is in the day position.
Figure 4:
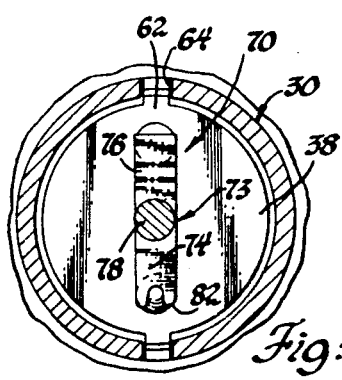
FIG. 4 is a fragmentary cross sectional view taken substantially along line 4—4 of FIG. 2.
Figure 5:
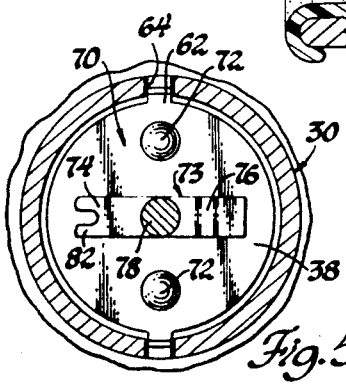
FIG. 5 is a fragmentary cross sectional view taken substantially along line 5—5 of FIG. 3.

In operation, let it be assumed that the positions of the primary and secondary actuating members 30 and 38 as illustrated in FIG. 3 is in the position wherein the primary actuating member 30 may be manually grasped and universally moved for positioning the mirror means 14 so that the operator of the vehicle may view the desired area rearwardly during normal daytime operating conditions. If the mirror is in this adjusted position and night conditions result in bright lights from the rear, the operator of the vehicle may rotate the knob 80 from the position shown in FIG. 3 to the position shown in FIG. 2 whereby the secondary actuating member 38 will be moved in a plane relative to the primary actuating member 30 to move the mirror means 14 from the day to the night position. It is to be noted that in rotating the knob 80, the shaft 78 is rotated about an axis which passes through the point about which both the primary and secondary members 30 and 38 universally move and therefore rotative forces applied to the knob 80 do not result in forces being applied to the primary actuating member 30 which result in movement of the primary actuating member 30. Such inadvertent and undesirable movement of the primary actuating member 30 would result in moving the mirror means 14 out of the selected viewing position.

Furthermore, the secondary actuating member may not move universally relative to the primary actuating member so that movement thereof only causes movement of the mirror means about an axis and not universal movement which would alter the selected viewing position.

Thus, the novel control means 70 moves the secondary actuating members 38 between the day and night positions while preventing or without the resultant application of forces to the primary actuating member 30 which would move the primary actuating member 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remotely controlled day-night mirror assembly comprising; a base; mirror means having two reflecting surfaces of different reflecting power movably supported on said base; actuator means operatively connected to said mirror means for adjusting the position of said mirror means relative to said base, said actuator means including support means, primary actuating means movably supported by said support means, secondary actuating means supported for movement relative to said primary actuating means between day and night positions and for moving with said primary actuating means when in said day and night positions, connection means interconnecting said primary and secondary actuating means for limiting relative rotation therebetween, control means movably supported by said primary actuating means for moving said secondary actuating means relative thereto between said day and night positions, and motion transmitting means operatively interconnecting said mirror means and said secondary actuating means whereby said mirror means may be moved to a selected position by moving said primary actuating means to move said secondary actuating means and whereby said secondary actuating means may be moved independently of said primary actuating means between said day and night positions to selectively present one of said two reflecting surfaces.

2. A remotely controlled day-night mirror assembly comprising; a base; mirror means having two reflecting surfaces of different reflecting power movably supported on said base; actuator means operatively connected to said mirror means for adjusting the position of said mirror means relative to said base, said actuator means including support means, primary actuating means, secondary actuating means universally supported by said support means for universal movement about a point, said primary actuating means being universally supported for universal movement about said point and for moving said secondary actuating means therewith, positioning means for retaining said primary actuating means in any selected position to which moved, connection means interconnecting said primary and secondary actuating means for preventing relative rotation therebetween and only allowing movement of said secondary actuating means relative to said primary actuating means in a plane passing through said point, control means movably supported by said primary actuating means for moving said secondary actuating means relative thereto in said plane between said day and night positions, and motion transmitting means operatively interconnecting said mirror means and said secondary actuating means, whereby said mirror means may be moved to a selected position by moving said primary actuating means to move said secondary actuating means and whereby said secondary actuating means may be moved in said plane by said control means independently of said primary actuating means between said day and night positions to selectively present one of said two reflecting surfaces.

3. An assembly as set forth in claim 2 wherein said control means is rotatably supported by said primary actuating means for rotation relative to said primary and secondary actuating means about an axis which passes through said point and is disposed in said plane.

4. A remotely controlled day-night mirror assembly comprising; a base; mirror means having two reflecting surfaces of different reflecting power movably supported on said base; actuator means operatively connected to said mirror means for adjusting the position of said mirror means relative to said base, said actuator means including support means, primary actuating means movably supported by said support means, secondary actuating means supported for movement relative to said primary actuating means between day and night positions and for moving with said primary actuating means when in said day and night positions, control means rotatably supported by said primary actuating means for rotation independently of said primary and secondary actuating means and coacting with said secondary actuating means for moving said secondary actuating means between said day and night positions, and motion transmitting means operatively interconnecting said mirror means and said second actuating means whereby said mirror means may be moved to a selected position by moving said primary actuating means to move said secondary actuating means and whereby said secondary actuating means may be moved by said control means independently of said primary actuating means between said day and night positions to selectively present one of said two reflecting surfaces.

5. A remotely controlled day-night mirror assembly comprising; a base; mirror means having two reflecting surfaces of different reflecting power movably supported on said base; actuator means operatively connected to said mirror means for adjusting the position of said mirror means relative to said base, said actuator means including support means, primary actuating means, secondary actuating means universally supported by said support means for universal movement about a point, said primary actuating means being universally supported for universal movement about said point and for moving said secondary actuating means therewith, positioning means for retaining said primary actuating means in any selected position to which moved, control means rotatably supported by said primary actuating means for rotation relative to said primary and secondary actuating means about an axis which passes through said point and coacting with said secondary actuating means for moving said secondary actuating means between said day and night positions, and motion transmitting means operatively interconnecting said mirror means and said secondary actuating means whereby said mirror means may be moved to a selected position by moving said primary actuating means to move said secondary actuating means and whereby said secondary actuating means may be moved by said control means independently of said primary actuating means between said day and night positions to selectively present one of said two reflecting surfaces.

6. An assembly as set forth in claim 5 wherein said control means includes cam means for moving said secondary actuating means between said day and night positions.

7. An assembly as set forth in claim 5 including connection means interconnecting said primary and secondary actuating means for limiting relative rotation therebetween about said axis.

8. An assembly as set forth in claim 7 wherein said control means includes cam means for moving said secondary actuating means between said day and night positions.

9. An assembly as set forth in claim 8 including friction means for frictionally retaining said control means in at least one of said day and night positions.

10. An assembly as set forth in claim 9 wherein said cam means includes at least one protrusion extending from said secondary actuating means and an arm movable into and out of engagement therewith for moving said secondary actuating means between said day and night positions.

11. An assembly as set forth in claim 10 wherein said control means further includes a shaft rotatably supported by said primary actuating means for rotation about said axis, said arm being supported by and extending from said shaft.

12. An assembly as set forth in claim 11 wherein one of said protrusions extends from said secondary actuating means on diametrically opposite sides of said axis, said arm is defined by a first radial portion of a member attached to a first end of said shaft and extending diametrically thereacross, the oppositely extending second radial portion of said member defines an offset arm having the end portion thereof offset in a direction parallel to said axis for engaging one of said protrusions when the first mentioned arm engages the other protrusion.

13. An assembly as set forth in claim 12 including a knob attached to the second end of said shaft.

14. An assembly as set forth in claim 13 wherein said friction means is defined by a bifurcated end of one of said arms for straddling one of said protrusions for frictionally retaining said member in engagement with said protrusions.

15. An assembly as set forth in claim 14 wherein said support means includes a circular generally cap-shaped housing with said primary actuating means and said knob being accessible through the opening of said housing, said positioning means comprises a ring disposed in a groove in said housing and frictionally engaging a first male semi-spherical outer surface of said primary actuating means, said support means further includes a support shaft slidably supported by said housing and including a spherical head, said secondary actuating means includes a first female semi-spherical surface in engagement with said head of said support shaft, said primary actuating means includes a cavity therein which presents a second female semi-spherical surface and said secondary actuating means includes a second male semi-spherical surface in sliding engagement therewith, said connection means includes a coacting tongue and groove extending from said second female and male semi-spherical surfaces, and including biasing means reacting between said support shaft and said housing for urging said head into engagement with said secondary actuating means and the latter into engagement with said primary actuating means and the latter into engagement with said ring, said motion transmitting means comprises three push-pull assemblies each including a motion transmitting element connected at one end to said secondary actuating means and at the other end to said mirror means.

* * * * *